United States Patent
Utke

(10) Patent No.: US 6,683,535 B1
(45) Date of Patent: Jan. 27, 2004

(54) WATER DETECTION SYSTEM AND METHOD

(75) Inventor: Gene H. Utke, Arcadia, FL (US)

(73) Assignee: Alderon Industries, LLC, Vergas, MN (US)

( * ) Notice: Subject to any disclaimer, the term of this patent is extended or adjusted under 35 U.S.C. 154(b) by 0 days.

(21) Appl. No.: 09/634,560

(22) Filed: Aug. 9, 2000

(51) Int. Cl.[7] .............................................. G08B 21/00
(52) U.S. Cl. ...................... 340/604; 340/605; 340/618; 340/620; 200/61.04; 73/307
(58) Field of Search ................................ 340/604, 605, 340/532, 533, 534, 620, 618; 137/312; 200/61.04; 324/664, 694; 73/1.16, 1.17, 1.31, 1.73, 40, 305, 307, 308, 313–324

(56) References Cited

U.S. PATENT DOCUMENTS

| | | | |
|---|---|---|---|
| 4,126,857 A | * 11/1978 | Lancia et al. | 340/620 |
| 4,222,711 A | * 9/1980 | Mayer | 340/605 |
| 4,227,190 A | * 10/1980 | Kelley et al. | 340/604 |
| 4,252,088 A | * 2/1981 | Frisby | 122/507 |
| 4,259,982 A | * 4/1981 | Bartels | 340/620 |
| 4,740,777 A | * 4/1988 | Slocum et al. | 340/522 |
| 4,845,472 A | * 7/1989 | Gordon et al. | 340/605 |
| 4,850,223 A | * 7/1989 | Carlin et al. | 73/49.2 |
| 4,876,530 A | * 10/1989 | Hill et al. | 340/605 |
| 5,091,715 A | * 2/1992 | Murphy | 340/604 |
| 5,240,022 A | * 8/1993 | Franklin | 340/636 |
| 5,428,347 A | * 6/1995 | Barron | 340/604 |
| 5,546,009 A | * 8/1996 | Raphael | 324/694 |
| 5,591,901 A | * 1/1997 | Heckman | 73/61.43 |
| 5,632,302 A | * 5/1997 | Lenoir, Jr. | 137/312 |
| 5,877,689 A | * 3/1999 | D'Amico | 340/605 |
| 6,084,520 A | * 7/2000 | Salvucci | 340/605 |
| 6,147,613 A | * 11/2000 | Doumit | 340/605 |
| 6,157,307 A | * 12/2000 | Hardin | 340/604 |
| 6,186,162 B1 | * 2/2001 | Purvis et al. | 137/312 |
| 6,369,714 B2 | * 4/2002 | Walter | 340/605 |

* cited by examiner

Primary Examiner—Toan Pham

(57) ABSTRACT

A water detection system for detecting water and activating an alarm is provided. The water detection system includes an alarm relay and a water sensor. The water sensor includes a solid state switching and amplifying circuit for detecting low levels of current flow and amplifying the signal to activate the alarm relay. In one embodiment, the water detection system further includes an alarm panel, including visual and audible alarms activated by the alarm relay. In one embodiment, the water detection system includes multiple water sensors for providing zone protection. In one embodiment, the alarm relay is configured to shut-down the device causing the presence of water. A method for implementation of the water detection system is also provided.

20 Claims, 4 Drawing Sheets

WATER DETECTION SYSTEM AND METHOD

CROSS-REFERENCE TO RELATED APPLICATION

None.

BACKGROUND OF THE INVENTION

The present invention relates to a system and method for detecting the presence of water. More particularly, it relates to a solid-state electronic circuit for detecting the presence of water and a method for using the circuit.

Undetected water leaks can cause property damage, equipment shutdowns, and expensive clean-up costs. Furthermore, these leaks can create a hazardous working environment for persons in the vicinity of a leak. Typical uses for water detection systems include placement beneath air conditioning systems to detect condensation overflow, placement in homes to detect water overflow onto the floor from a sump, and placement in selected locations in various-commercial processes to detect undesired water leaks and overflows.

One type of water detection system, a closed-circuit-type system, includes a sensor having two conductive probes. The sensor is placed at the location that water detection is desired, and the presence of water is detected when the water closes an electrical circuit by connecting the two probes. This closed-circuit-type water detection system is capable of detecting a thin film of water. The amount of water necessary for proper operation of this type of water detection system depends upon the sensitivity of the circuit and its ability to detect a flow of electrons between the two probes.

Closed-circuit-type water detection systems, known in the prior art, all have shortcomings that limit their effectiveness, reliability, and safety. One system uses a high voltage applied to the probes in a series circuit, along with a relay. While the high voltage may help to detect the presence of smaller amounts of water, it has several disadvantages, including creating an unsafe condition for persons in the operating environment. Other systems apply high current levels to the probes, which can result in an unsafe operating condition and can cause deterioration of the probes due to electrolysis. Still other water detection systems use highly sensitive solid-state circuitry, but the design limits the possible distance between the sensor and an alarm. This distance is limited because the use of long wires creates a voltage drop, a capacitive effect, and an inductive effect which can act to create false alarms.

There remains a need in the art for an effective and safe water detection system that can detect very small amounts of water, and for a system that allows the sensors to be placed at substantial distances from an alarm.

BRIEF SUMMARY OF THE INVENTION

The present invention is a water detection system for detecting water and activating an alarm. In one embodiment, the system includes a sensor and an alarm. The sensor includes a first probe and a second probe coupled to an amplifying and switching circuit. The sensor further includes first and second terminals located across the amplifying and switching circuit. The first probe and second probe are configured to contact any of the liquid present in the operating environment. The alarm housing includes an alarm circuit for activating an alarm and is electrically coupled to the first and second terminals of the sensor.

While several alternative embodiments are disclosed, still other embodiments of the present invention will become apparent to those skilled in the art from the following detailed description, wherein is shown and described only the embodiments of the invention, by way of illustration, of the best modes contemplated for carrying out the invention. As will be realized, the invention is capable of modification in various obvious aspects, all without departing from the spirit and scope of the present invention.

Accordingly, the drawings and detailed description are to be regarded as illustrative in nature and not restrictive.

DETAILED DESCRIPTION

Figure 1:
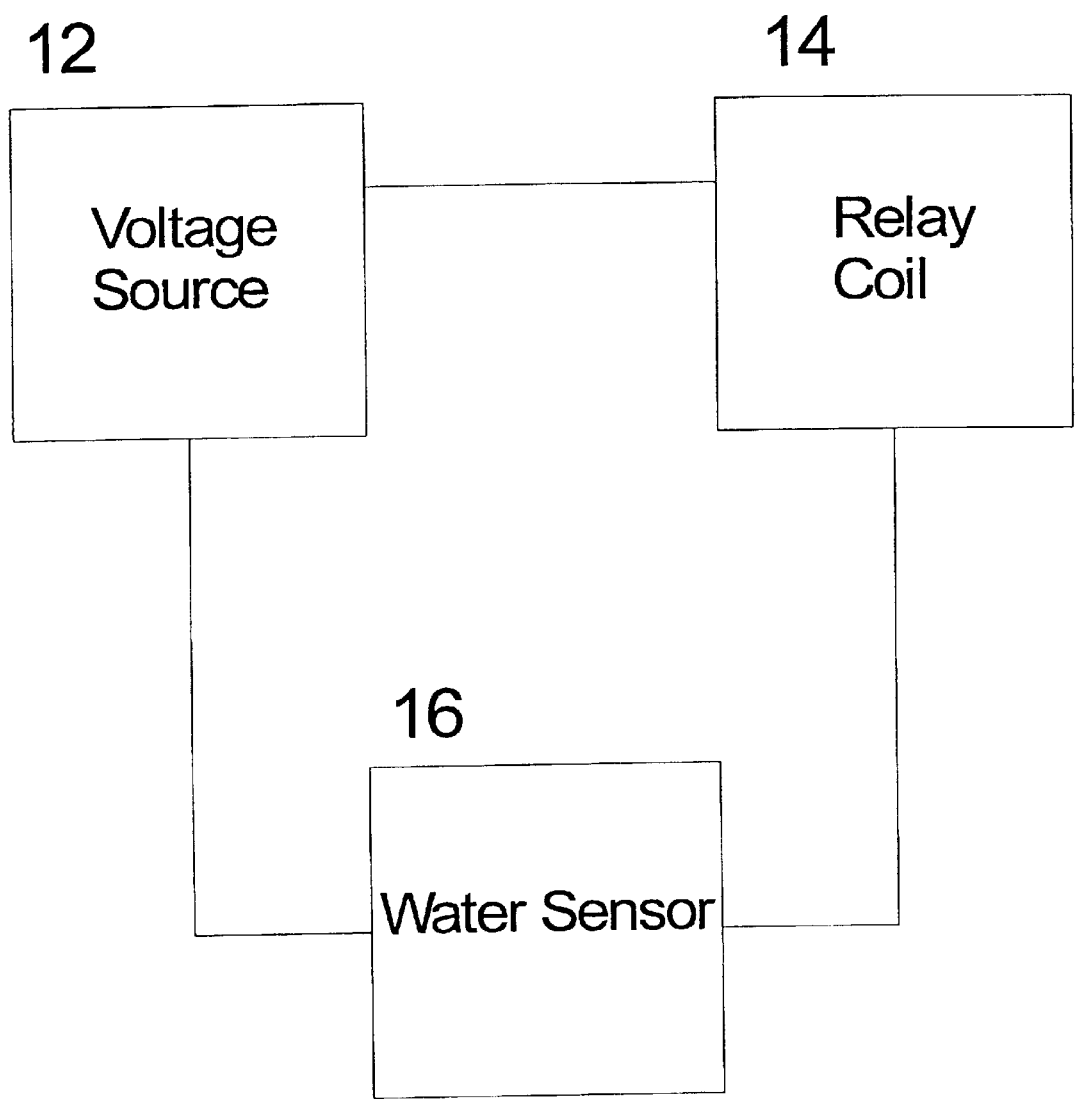
FIG. 1 is a block diagram showing components of a water detection system according to a first embodiment of the present invention.

FIG. 1 is a block diagram of a water detection system 10 according to a first embodiment of the present invention. As shown in FIG. 1, the water detection system 10 includes a voltage source 12, a relay coil 14, and a water sensor 16, connected in series. The voltage source 12 provides the electricity to power the circuit. The relay coil 14 activates when a sufficient level of current flows through the circuit and operates to control an alarm or other auxiliary device. The water sensor 16 is placed at the detection site and operates by closing a circuit upon detection of the presence of water. In one embodiment of the present invention, all of the components shown in FIG. 1 are contained within one housing, which is then placed directly at the detection site. In another embodiment of the present invention, the voltage source 12 and the relay coil 14 are located in a separate housing and are coupled to the water sensor 16 by an electrical conductor. The voltage source 12 is typically either a battery or a direct current power supply.

Figure 2:
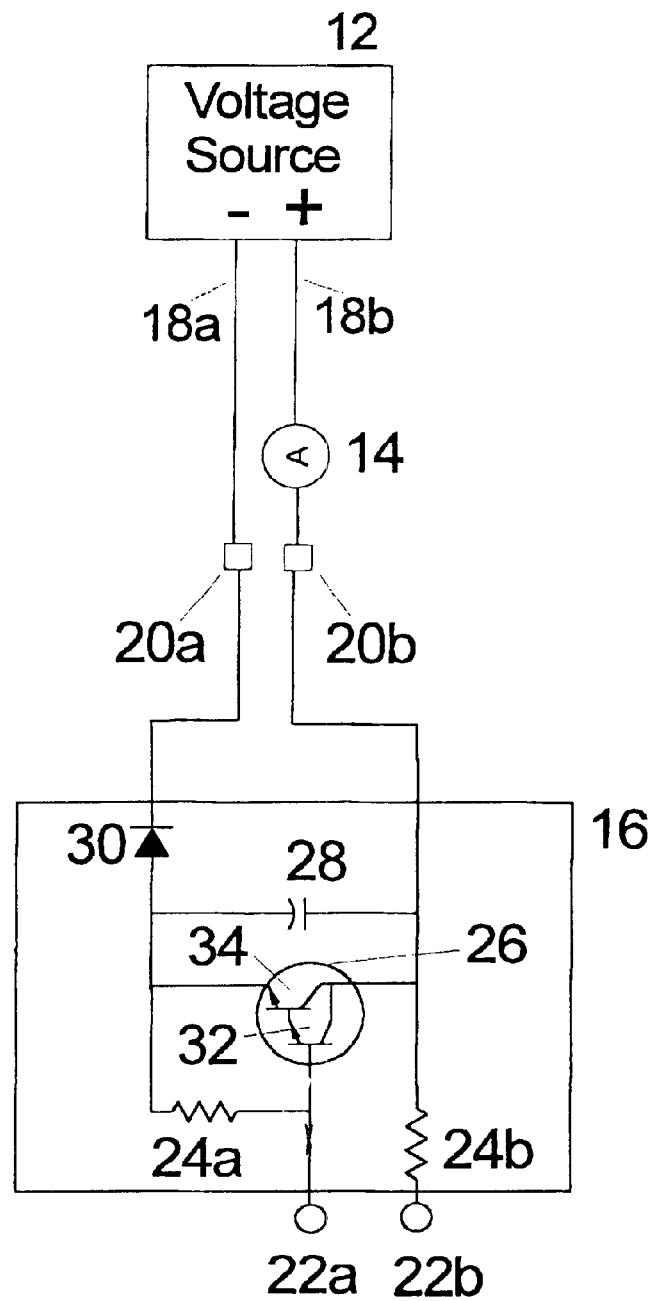
FIG. 2 is a schematic diagram showing the circuitry of the water detection system shown in FIG. 1.

FIG. 2 is a schematic diagram showing the water detection system 10. As shown near the top of FIG. 2, the voltage source 12 includes a first conductor 18a, coupled to a negative terminal, and a second conductor 18b, coupled to a positive terminal. As shown near the middle of FIG. 2, the water sensor 16 includes a first terminal 20a and a second terminal 20b. The first conductor 18a is coupled to the first terminal 20a of the water sensor 16. The second conductor 18b is coupled to the relay coil 14, which in turn is coupled to the second terminal 20b of the water sensor 16.

As shown near the bottom of FIG. 2, the water sensor 16 includes a first probe 22a, a second probe 22b, a first resistor 24a, a second resistor 24b, a transistor circuit 26, a capacitor 28, and a diode 30. The probes 22a and 22b act as the terminals of a switch that is closed by the presence of water. In one embodiment, the probes 22a and 22b are placed about one half inch apart. The resistors 24a and 24b are biasing resistors and have appropriate values to allow proper operation of the transistor circuit 26. The values of the resistors 24a and 24b control the sensitivity of the transistor circuit 26, and one of ordinary skill in the art can select appropriate resistance values. The transistor circuit 26 is connected across the probes 22a and 22b. The capacitor 28 acts to smooth any ripple voltage in the signal coming from the voltage source 12. The diode 30 acts to prevent the circuit from damage if the terminals of the voltage source 12 are connected to the water sensor 16 in reverse polarity.

In one embodiment of the present invention, the water detection system is contained within one housing, which is placed at the water detection site. In other words, each of the voltage source 12, the relay coil 14, and the water sensor 16, are placed within the same housing. The relay coil 14 includes additional leads (not shown) that couple to an alarm device.

During operation of the water detection system 10 of the present invention, the water detection system 10 is placed at the water detection site. When no water is present, or insufficient water is present to create a conduction path between the probes 22a and 22b, no current from the voltage source 12 will flow in the circuit. At this point, the electric potential of the voltage source 12 between the positive and negative terminals is present across first terminal 20a and second terminal 20b, as the potential will move through the relay coil 14. This electric potential then enters the water sensor 16 where the diode 30 prevents a reverse polarity connection, and the capacitor 28 smooths the signal. This smoothed voltage signal is then communicated to the emitter and collector terminals of the transistor circuit 26. The electric potential is further transmitted to the probes 22a and 22b. At this time, however, as no water is present, the current does not flow through the circuit, as it is open at the probes 22a and 22b.

When water is present between the probes 22a and 22b, it will close the circuit and cause current to flow. Because of the high resistance of water, only a small amount of current will flow. In the case of distilled water, it is possible that only a very small level of current will flow through the circuit. This current flow is detected at the base of the transistor circuit 26.

As shown in FIG. 2, in the center of the water sensor 16, the transistor circuit 26 includes an amplifying transistor 32 and a switching transistor 34. The small current flow, now present across the probes 22a and 22b, reaches the base of the amplifying transistor 32, which then operates to allow a current to flow from the voltage source 12 through the amplifying transistor 32 and out its emitter. The emitter of the amplifying transistor 32, as shown in FIG. 2, is coupled to the base of the switching transistor 34. This current flow, reaching the base of the switching transistor 34, allows a larger current from the voltage source 12 to be amplified through the switching transistor 34. When the switching transistor 34 is activated, it allows a larger amount of current to flow through the circuit from the voltage source 12, thereby effectively acting to close a switch between the first terminal 20a and the second terminal 20b. In one embodiment of the present invention, the transistor circuit 26 is a Darlington transistor, as known to those of skill in the art.

The switching transistor 34, however, has an internal resistance which allows some amount of the current to continue to flow, through the probes 22a and 22b, to the base of the amplifying transistor 32, which ensures that the switching transistor 34 remains active as long as water is present. At this point, a majority of the current from the voltage source 12 will flow through the relay 14 and the switching transistor 34, thereby activating the relay.

In one embodiment, the relay coil 14 needs seventy percent of its rated voltage to activate. Therefore, any extremely small current that are amplified by the transistor circuit 26 do not cause the relay coil 14 to activate. Once the current level reach the necessary level, the relay coil 14 is activated, and remains activated until it is reduced to five percent of its rated voltage. Thus, once the relay coil 14 is activated, the voltage at the first terminal 20a and the second terminal 20b can vary widely without causing the relay coil 14 to deactivate.

In one embodiment of the present invention, the circuitry components of the water sensor 16 are encapsulated in epoxy, and the entire housing is sealed to prevent water damage.

Figure 3:
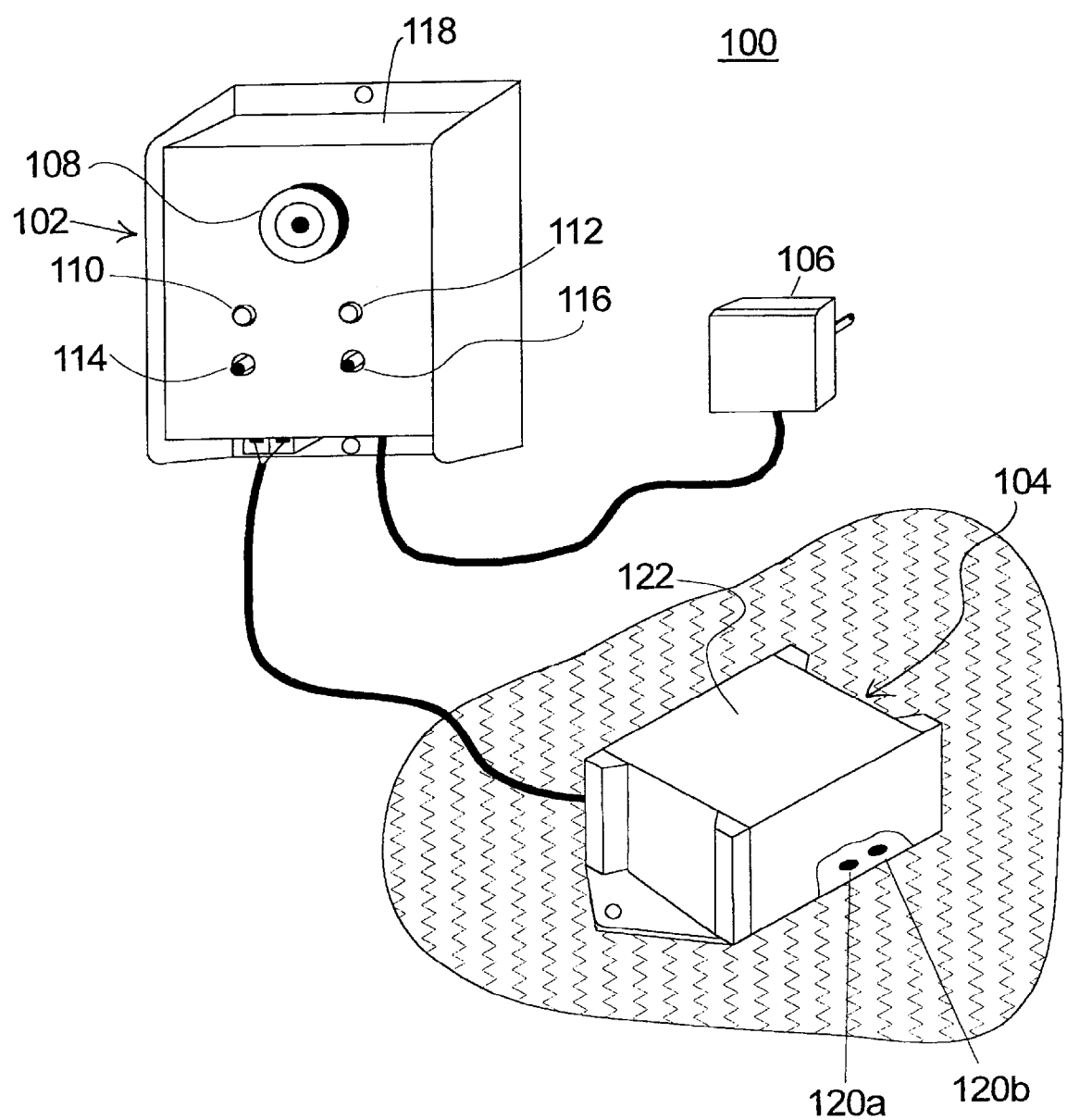
FIG. 3 is a perspective view of a water detection system according to a second embodiment of the present invention.

FIG. 3 is a perspective view of a water detection system 100 according to a second embodiment of the present invention. The water detection system 100 includes an alarm panel 102, a water sensor 104, and a power supply 106. The alarm panel 102 is electrically coupled to the water sensor 104. The alarm panel 102 is further electrically coupled to the power supply 106. The power supply 106, in one embodiment, is designed to convert one hundred twenty volts alternating current into nine volts direct current, and is plugged into a standard wall receptacle. In other embodiments, the power supply 106 is designed to convert power having a wide variety of voltages and frequencies to nine volts direct current. This allows the water detection system 100 to be used with power outlets around the world. In another embodiment, the power supply 106 is a battery. The power supply 106 provides the power needed for operation of the water detection system 100. The design of the present invention allows the water sensor 104 to be placed at a large distance from the alarm panel 102, by using conductive wire. Excessive wire length is not a problem, as it is in the prior art, because the circuitry that performs the sensing is located in the water sensor 104. Therefore, false positive signals are not created by long wire length, in the design of the present invention.

The alarm panel 102, as shown near the top of FIG. 3, includes an audible alarm 108, abnormal indicator light 110, an alarm indicator light 112, a test switch 114, and a silence switch 116, all contained within a housing 118. The components of the alarm panel 102 will be described in greater detail below with reference to the circuit diagram shown in FIG. 4. The water sensor 104 includes probes 120A and 120B on a bottom surface of a housing 122.

Figure 4:
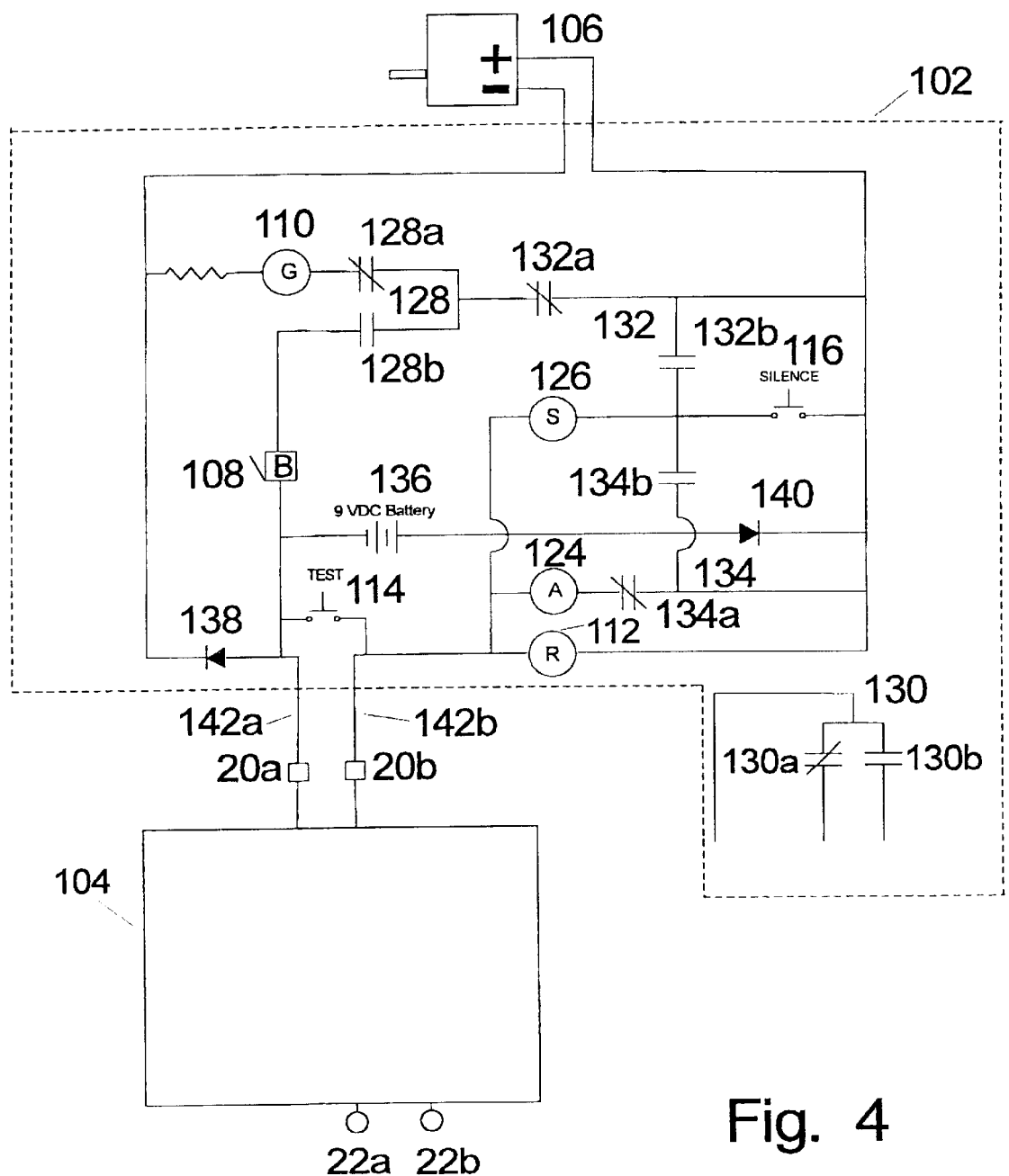
FIG. 4 is a schematic diagram of the circuitry of the second embodiment of the present invention.

FIG. 4 shows a circuit schematic for the water detection system 100 of the present invention. As shown near the top of FIG. 4, the alarm panel 102 is connected to the power supply 106. Power from the power supply 106 flows into the circuit as indicated. The circuitry of the alarm panel 102 include an alarm relay coil 124 and a silence relay coil 126. The alarm relay coil 124 includes a first set of contacts 128 and a second set of contacts 130. The first set of contacts 128 includes normally closed contacts 128a and normally open contacts 128b. The second set of contacts 130 include normally closed contacts 130a and normally open contacts 130b. The silence relay coil 126 includes a first set of contacts 132 and a second set of contacts 134. The first set of contacts 132 includes normally closed contacts 132a and normally open contacts 132b. The second set of contacts 134 includes normally closed contacts 134a and normally open contacts 134b. The circuitry of the alarm panel 102 further includes a battery 136 connected to the negative terminal of the power supply 106, by a first diode 138, when external voltage is present at the power supply 106. A second diode 140 connects the battery 136 to the positive terminal of the power supply 106 when external voltage is absent. Also, when external voltage is absent, the first diode 138 acts as an open circuit to prevent the battery 136 from energizing the normal indicator light 110. This indicates to the operator that power has failed, and also acts to conserve the energy of the battery 136. As shown near the bottom of FIG. 4, the wires 142a and 142b are designed for coupling to the water sensor 104. The internal circuitry of the water sensor 104 is not shown in FIG. 3, because it is the same as that of the water sensor 16 shown in FIG. 2.

During operation, when no water is present across the probes 22a and 22b of the water sensor 104, power from the power supply 106 will flow through the normal indicator light 110, the normally closed contacts 128a, and the normally closed contacts 132a. This will cause the normal indicator light 110 to glow, indicating a normal operating condition. At this time, current is not flowing through any other portion of the circuit in the alarm panel 102. As explained above, with reference to FIG. 2, the electric potential from the power supply 106 is transmitted to the terminals 20a and 20b of the water sensor 104 through the alarm relay coil 124. When water is present across the terminals 22a and 22b, the water sensor 104 will operate, as described above with reference to FIG. 2, and current will begin to flow through the water sensor 104 circuitry. At this point, with water present between the probes 22a and 22b, the water sensor 104 essentially acts to close the path between contacts 20a and 20b and allow current to flow through the circuitry in the alarm panel 102.

This closed path allows current to flow through the alarm indicator light 112, causing it to glow, indicating an alarm condition. It further allows current to flow through the alarm relay coil 124. Once current reaches seventy percent of the rated level of the alarm relay coil 124, it will activate. Because the alarm relay coil 124 is not activated until seventy percent of its rated level is reached, it acts to cancel out minor current fluctuations that may be present in the system. The alarm relay coil 124 is not activated until it a sufficiently high current level is reached. When the alarm relay coil 124 activates the first set of contacts 128 switch so that the normally closed contacts 128a open, and the normally open contacts 128b close, this switch causes the normal indicator light 110 to shut off, indicating that water has been detected. It also allows current to flow through the buzzer 108 to create an audible alarm signal. The second set of contacts 130 of the alarm relay coil 124, as shown near the bottom right in FIG. 4, are intended for use with an auxiliary device. For instance, they could be connected to a device that is the cause of the water leak and the leak detection will act to shut down the device.

If the operator of the water detection system 10 wishes to shut off the audible alarm created by the buzzer 108, he may press the silence switch 116. Pressing the silence switch 116 will energize the silence relay coil 126, causing actuation of its first set of contacts 132 and its second set of contacts 134. The normally closed contacts 132a will open and the normally open contacts 132b will close. Opening of contacts 132a will cause the buzzer 108 to be cut off from the power supply 106. The closing of the normally open contacts 132b causes the silence relay coil 126 to latch on as it creates a coupling to the power supply 106 even after the silence switch 116 is released. The activation of the silence relay coil 126 will also cause the normally open contact 134b to close and the normally closed contact 134a to open. The opening of the normally closed contacts 134a will deactivate the alarm relay coil 124. The current will now flow through the silence relay coil 126 instead of the alarm relay coil 124.

When water is removed from the probes 22a and 24b, the current will stop flowing through the water sensor 104 and the silence relay coil 126 will deactivate, returning the system to its initial state. In one embodiment, the circuitry of the alarm panel 102 includes a test switch 114 which may be used to test the various indicators on the alarm panel 102.

In an alternative embodiment of the present invention, the alarm relay coil 124 is located in a housing separate from the alarm panel 102. In another embodiment of the present invention, multiple water sensors 104 can be connected to the alarm panel 102 to provide zone protection. The circuitry of the alarm panel 102 is capable of monitoring multiple water detectors 104 by connecting each of the water detectors to the terminals 20a and 20b in parallel. The presence of water at any set of probes of any of the water sensors 104 will cause the alarm circuitry to activate. The design of the present invention allows the use of multiple water detectors 104, because the water detectors 104 do not draw current until water is present. Therefore, there is essentially no limit on the number of water detectors 104 than can be used. In another of the present invention, a float switch is connected in parallel with the water sensor 104. When either the water sensor 104 or the float switch detects the presence of water, or water at a specified level, it will activate the alarm circuitry.

While the above description describes the present invention with reference to water detection, it should be appreciated that the present invention may also be used to detect the presence or the level of other conductive liquids. Although the present invention has been described with reference to preferred embodiments, persons skilled in the art will recognize that changes may be made in form and detail without departing from the spirit and scope of the invention.

I claim:

1. A system for detecting the presence of a conductive liquid, the system comprising:
    an alarm housing, including a power source, an alarm, and a relay; and
    a sensor housing, for detecting the liquid, having two probes and a switching and amplifying transistor, the sensor housing located remotely from the alarm housing;
    wherein the switching and amplifying transistor is electrically coupled to the power source, the alarm, and the relay, so as to form an alarm circuit.

2. A system for detecting the presence of a conductive liquid in an operating environment, the system comprising:
    a sensor housing including a first probe and a second probe coupled to an amplifying and switching transistor and first and second terminals located across the amplifying and switching transistor, the first probe and second probe configured to contact any of the conductive liquid present in the operating environment; and
    an alarm housing, located remotely from the sensor housing, including an alarm relay for activating an alarm, the alarm relay electrically coupled to the first and second terminals of the sensor to form an alarm circuit.

3. The system of claim 2 wherein the liquid detected is water.

4. The system of claim 3 wherein the alarm housing is connected to a plurality of the sensor housings in parallel, such that detection of the water by any one of the sensor housings will close the alarm circuit and activate the alarm.

5. The system of claim 3 further comprising a float switch connected in parallel to the alarm circuit to detect a specified level of water and close the alarm circuit when that level is detected.

6. The system of claim 2 further comprising a power supply electrically coupled to the alarm housing for supplying power to the alarm circuit.

7. The system of claim 2 wherein the alarm located in the alarm housing is an audible alarm.

8. The system of claim 7 wherein the alarm circuit includes a silence relay that is actuated by a silence switch, the silence relay operating to remove the flow of power to the audible alarm and to latch itself on while power continues to flow through the amplifying and switching transistor.

9. The system of claim 2 wherein the alarm relay is actuated by flow of a sufficient current through the alarm relay, and further wherein actuation of the alarm relay closes a switch that activates the alarm.

10. The system of claim 9 wherein the al relay is configured to shut down an auxiliary device in the location of the water detection, upon the detection of water.

11. The system of claim 2 wherein the sensor housing is encapsulated in epoxy to prevent liquid entry, such that only the first probe and second probe are exposed.

12. The system of claim 2 wherein the amplifying and switching transistor includes an amplifying transistor and a switching transistor configured such that an emitter of the amplifying transistor is connected to the base of the switching transistor.

13. The system of claim 12 wherein the amplifying transistor is activated when the liquid is present across the first and second probes, which in turn activates the switching transistor which acts to connect the first and second terminals of the sensor housing.

14. The system of claim 2 wherein the amplifying and switching transistor is a Darlington transistor.

15. The system of claim 2 wherein the alarm housing supplies electrical power to the sensor housing.

16. A water detection circuit, powered by a power source, for detecting the presence of water, the water detection circuit comprising:

a relay coil adapted to be activated by the flow of a sufficient amount of current;

a first probe and a second probe configured to contact the water, the first and second probes forming a first switch connected in series with the power source and the relay coil; and a second switch connected in series with the power source and the relay coil and connected in parallel with the first switch, the second switch including a switching transistor activated by an amplifying transistor coupled to its base, wherein the amplifying transistor is activated upon the presence of water between the first and second probes.

17. The water detection circuit of claim 16 further comprising an alarm coupled to the relay coil, the alarm activated upon activation of the relay coil.

18. The water detection circuit of claim 16 wherein the current flowing between the first and second probes, in the presence of the water, is less than one milliamp.

19. A method of detecting water at a remote location and signaling the detection, the method comprising the steps of:

positioning a sensor housing, including a first probe and a second probe for contacting the water, at a detection location, the sensor housing further including a switching and amplifying transistor having a first terminal and a second terminal; and coupling the sensor housing to a second housing including an alarm, a relay, and a power source to form an alarm circuit, wherein the second housing is positioned at a remote location from the sensor housing.

20. The method of claim 19 further comprising the steps of:

connecting a base and a collector of an amplifying transistor, in the alarm circuit, to the first and second probes; and connecting a collector and an emitter of a switching transistor to the first terminal and the second terminal.

* * * * *

UNITED STATES PATENT AND TRADEMARK OFFICE
CERTIFICATE OF CORRECTION

PATENT NO.    : 6,683,535 B1
DATED         : January 27, 2004
INVENTOR(S)   : Gene H. Utke It is certified that error appears in the above-identified patent and that said Letters Patent is hereby corrected as shown below:

Column 7,
Line 12, please delete "the al relay" and insert -- the alarm relay -- therefor.

Signed and Sealed this

Twenty-second Day of June, 2004

JON W. DUDAS
*Acting Director of the United States Patent and Trademark Office*